(12) United States Patent
Egan, Jr. et al.

(10) Patent No.: US 9,125,391 B2
(45) Date of Patent: Sep. 8, 2015

(54) SWIVELING TIP FOR A FISHING ROD (76) Inventors: Raymond W. Egan, Jr., West Chesterfield, NH (US); Todd E. Bottomley, Chesterfield, NH (US)

( * ) Notice: Subject to any disclaimer, the term of this patent is extended or adjusted under 35 U.S.C. 154(b) by 164 days.

(21) Appl. No.: 13/430,589

(22) Filed: Mar. 26, 2012

(65) Prior Publication Data

US 2013/0247442 A1 Sep. 26, 2013

(51) Int. Cl.
*A01K 87/04* (2006.01)

(52) U.S. Cl.
CPC ..................................... *A01K 87/04* (2013.01)

(58) Field of Classification Search
USPC .......................................... 43/18.1 R, 24, 25
See application file for complete search history.

(56) References Cited

U.S. PATENT DOCUMENTS

| 899,914 | A | 9/1908 | Smith |
|---|---|---|---|
| 1,116,721 | A | 11/1914 | Meder |
| 1,142,796 | A | 6/1915 | Brugman |
| 2,324,353 | A | 2/1942 | Berry |
| 2,525,948 | A | 10/1950 | Ruiz |
| 2,559,933 | A | 7/1951 | Briney |
| 2,652,654 | A | 9/1953 | Bahn |
| 2,878,608 | A | 2/1956 | O'brien, Jr. |
| 3,006,099 | A | 10/1961 | Gourley |
| 3,303,595 | A | 2/1967 | Wells et al. |
| 3,350,809 | A | 11/1967 | Chion |
| 4,722,141 | A | 2/1988 | Lim et al. |
| 4,807,385 | A | 2/1989 | Morishita |
| 5,276,991 | A | 1/1994 | Stotesbury et al. |
| 5,383,300 | A | 1/1995 | Stotesbury et al. |
| 5,417,007 | A | 5/1995 | Stotesbury et al. |
| 5,531,041 | A | 7/1996 | Betto |
| 5,560,139 | A | 10/1996 | Lembree |
| 6,263,609 | B1 | 7/2001 | Kollodge et al. |
| 6,612,065 | B1 | 9/2003 | Blanchette et al. |
| 6,802,151 | B1 | 10/2004 | Jochum |
| 7,513,075 | B2 | 4/2009 | Gerber |
| 2005/0034353 | A1 | 2/2005 | Gustlin |
| 2009/0277070 | A1 | 11/2009 | Lindgren |

FOREIGN PATENT DOCUMENTS

| GB | 1310279 | 3/1973 |
|---|---|---|
| GB | 1542260 A | 3/1979 |

*Primary Examiner* — David Parsley
*Assistant Examiner* — George Andonyan
(74) *Attorney, Agent, or Firm* — The Bilicki Law Firm, P.C.

(57) ABSTRACT

A swiveling tip for a fishing rod includes a housing with a barrel positioned therein for rotating 360° around a longitudinal axis of the housing. The housing includes a first bore for receiving the barrel and a second bore for receiving a fishing rod. The barrel has a guiding assembly at a distal end thereof and nose member, which together with the roller, guides and receives a fishing line therebetween.

11 Claims, 11 Drawing Sheets

SWIVELING TIP FOR A FISHING ROD

CROSS-REFERENCE TO RELATED APPLICATIONS

This application incorporates by reference and is a Continuation-in-part of U.S. patent application Ser. No. 12/958,382, now U.S. Pat. No. 8,166,699.

BRIEF SUMMARY OF THE EMBODIMENTS OF THE INVENTION

In general the embodiments of the invention are directed to a swiveling tip assembly for a fishing rod. The swiveling tip assembly includes a housing having a first bore and a second bore, the first bore and the second bore having first and second longitudinal axes respectively, wherein the first bore is adapted for receiving the tip of a fishing rod. Further, a rotatable barrel is disposed in the second bore of the housing. The barrel includes through hole that is parallel to and offset from the second longitudinal axis for receiving a fishing line. The swiveling tip assembly further includes a guiding assembly extending from the barrel, which includes a nose member having two opposing sides, a top portion, a bottom portion, and a cut-out portion formed therein. The nose member is adapted to guide the fishing line through the cut-out portion of the nose member.

DETAILED DESCRIPTION OF THE EMBODIMENTS OF THE INVENTION

An embodiment of a swiveling tip for use with a fishing rod is shown and described. In the embodiment, there is a housing which is adapted for connection to a fishing rod. The housing has a bore therethrough for receiving a barrel. The barrel further comprises a roller on an axle over which fishing line passes, and is redirected. The barrel is capable of 360° rotation within the bore of the housing. Reference will now be made in detail to the components of an embodiment of the swiveling tip, examples of which are illustrated in the drawings.

Figure 1:
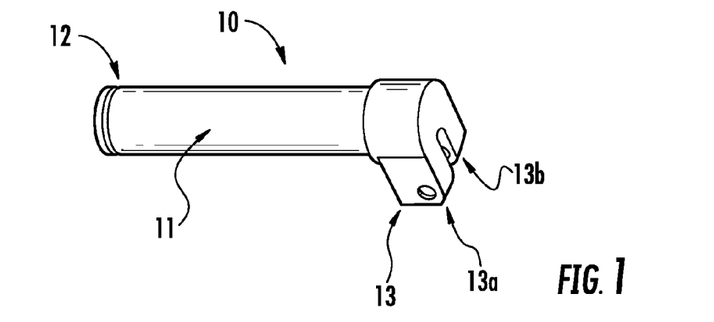
FIG. 1 illustrates a top perspective view of an embodiment of a barrel for a swiveling tip for a fishing rod.
Figure 2:
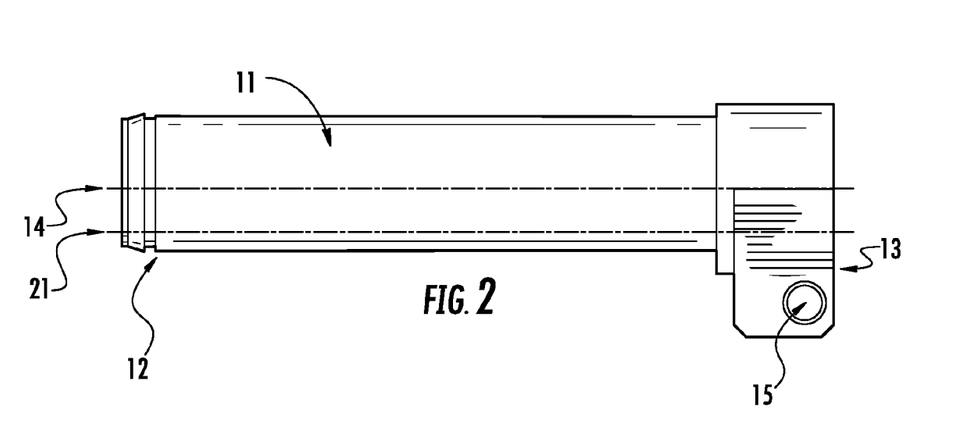
FIG. 2 illustrates a side view of an embodiment of a barrel for a swiveling tip for a fishing rod.
Figure 3:
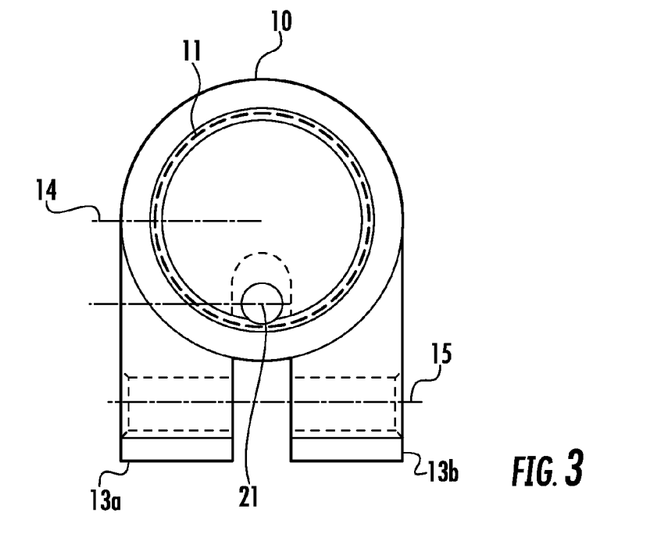
FIG. 3 illustrates a cross-sectional view of a barrel for a swiveling tip for a fishing rod.

FIGS. 1-3 illustrate one embodiment of a barrel for a swiveling tip for a fishing rod. The barrel 10 has a generally cylindrical portion 11 for mating with the housing of the swiveling tip. At the proximal end of barrel 10, there is a groove 12, into which a retaining member can be inserted to retain barrel 10 in the housing of the swiveling tip. At the distal end of barrel 10, there is an axle mounting member 13. Axel mounting member may take the form of two ears 13a and 13b extending perpendicular to the axis 14 of barrel 10. A hole 15 is provided in both of ears 13a and 13b for receiving an axle therethrough.

Figure 6:
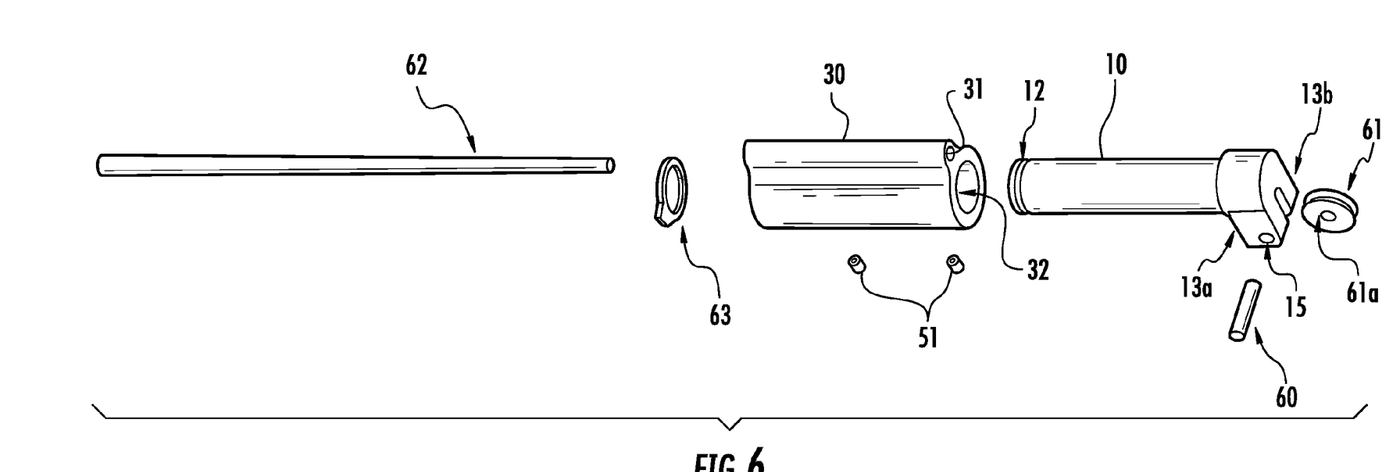
FIG. 6 illustrates an exploded view of an embodiment of a swiveling tip for a fishing rod.
Figure 7:
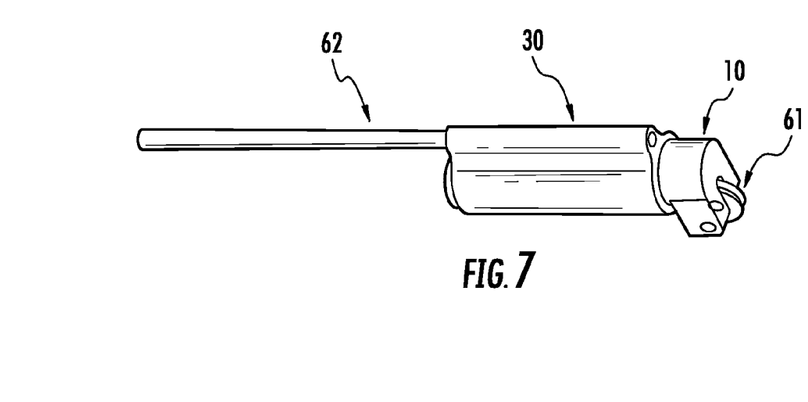
FIG. 7 illustrates an assembled view of an embodiment of a swiveling tip for a fishing rod.

As is shown in FIGS. 6 and 7, axle 60 is disposed in hole 15 and roller 61 is disposed on axel 60 and is thereby held in place between ears 13a and 13b. Through hole 21 is shown in FIGS. 2-3. Through hole 21 is parallel to and offset from axis 14. Fishing line (not shown) passes through hole 21 and then over roller 61, thereby being redirected from a first direction to a second direction.

Figure 4:
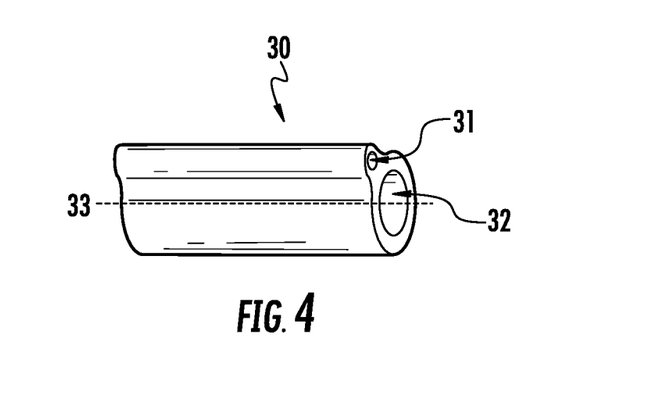
FIG. 4 illustrates a top perspective view of an embodiment of a housing for a swiveling tip for a fishing rod.
Figure 5:
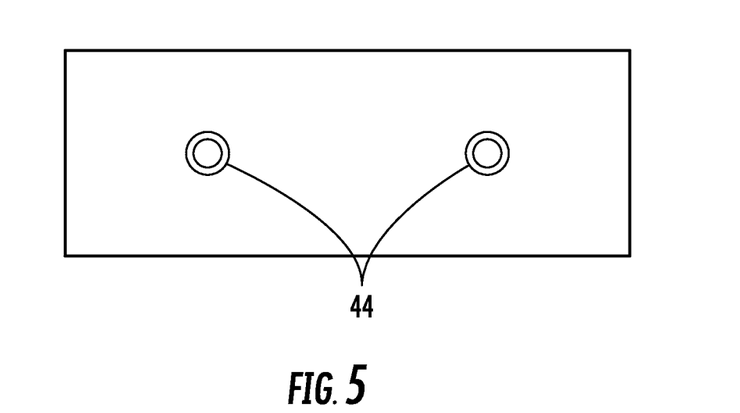
FIG. 5 illustrates a bottom view of an embodiment of a housing for a swiveling tip for a fishing rod.

FIGS. 4 and 5 also illustrate an embodiment of a housing for a swiveling tip for a fishing rod. Housing 30 has two parallel bores therethrough 31 and 32. Bore 31 is adapted for connecting the housing to a fishing rod. It can be appreciated that bore 31 need not extend all the way from the proximal end of housing 30 to the distal end of housing 30, as long as bore 31 is long enough to accommodate a section of the fishing rod sufficient for attachment of the housing to the rod. Alternatively, bore 31 may extend the entire length of housing 30. Bore 32 extends the entire length of housing 30 and is of a diameter slightly larger than barrel 10. When assembled, barrel 10 is disposed within bore 32 and is able to rotate 360° about the axis 33 of bore 32. It should be appreciated that barrel 10 and bore 32 act as bearing surfaces and may be configured to house rotary bearings. Barrel 10 is formed of a solid material in order to allow for rotational movement of barrel within bore 32.

As shown in FIG. 5, set screw holes 44 are provided in housing 30. Set screw holes 44 are generally perpendicular to axis 33. Set screw holes 44 allow set screws 51 penetrate into bore 31, thereby securing housing 30 to the fishing rod. It will be appreciated that housing 30 can be secured to the fishing rod by a suitable means such as adhesives or a friction fit, thereby obviating the need for set screw holes 44 and set screws 51. Set screw holes 44 in bore 32 serve to allow access to set screws 51 and provide lubrication points.

FIGS. 6 and 7 show exploded and assembled views of the swiveling tip for a fishing rod 1. As shown in these views, fishing rod 62 is inserted into bore 31 of housing 30, and may be retained in bore 31 by set screws 51. As noted above, any suitable means for securing fishing rod 62 in bore 31 may be used, such as adhesives or a friction fit in addition to or in lieu of using set screws 51. Barrel 10 is inserted into bore 32 of housing 30. Barrel 10 may be retained in bore 32 by retaining member 63. Retaining member 63 may take any suitable form, including but not limited to a retention clip. Retaining member 63 may engage groove 12 on barrel 10. Roller 61 is disposed between ears 13a and 13b of barrel 10, and mounted on axle 60 which passes through hole 15 in ears 13a and 13b. Hole 61a is provided in roller 61 to accommodate axle 60.

It will be appreciated that barrel 10, roller 61 and housing 30 may be constructed of any suitable material, including but not limited to stainless steel, stamped steel, other metals or plastic. Generally cylindrical portion 11 of barrel 10 is slightly longer than housing 30. To maximize the bearing characteristics of housing 30 and barrel 10, the length of generally cylindrical portion 11 (and therefore also the length of housing 30) should be approximately four times the diameter of generally cylindrical portion 11. However, one of ordinary skill in the art would appreciate that ratios of the length of cylindrical portion 11 to the diameter of cylindrical portion 11 of greater than or less than 4 to 1 could be used. It should also be appreciated that through hole 21 is parallel to and offset from axis 14 of barrel 10. Because through hole 21 is offset from axis 14, a moment arm is created, such that fishing line disposed in through hole 21 may act to rotate barrel 10 in housing 30, thereby allowing the swiveling tip 1 to swivel in the direction of line pull. One of ordinary skill in the art would readily appreciate that any one of a variety of distances between through hole 21 and axis 14 could be used to create the necessary moment arm.

Figure 8:
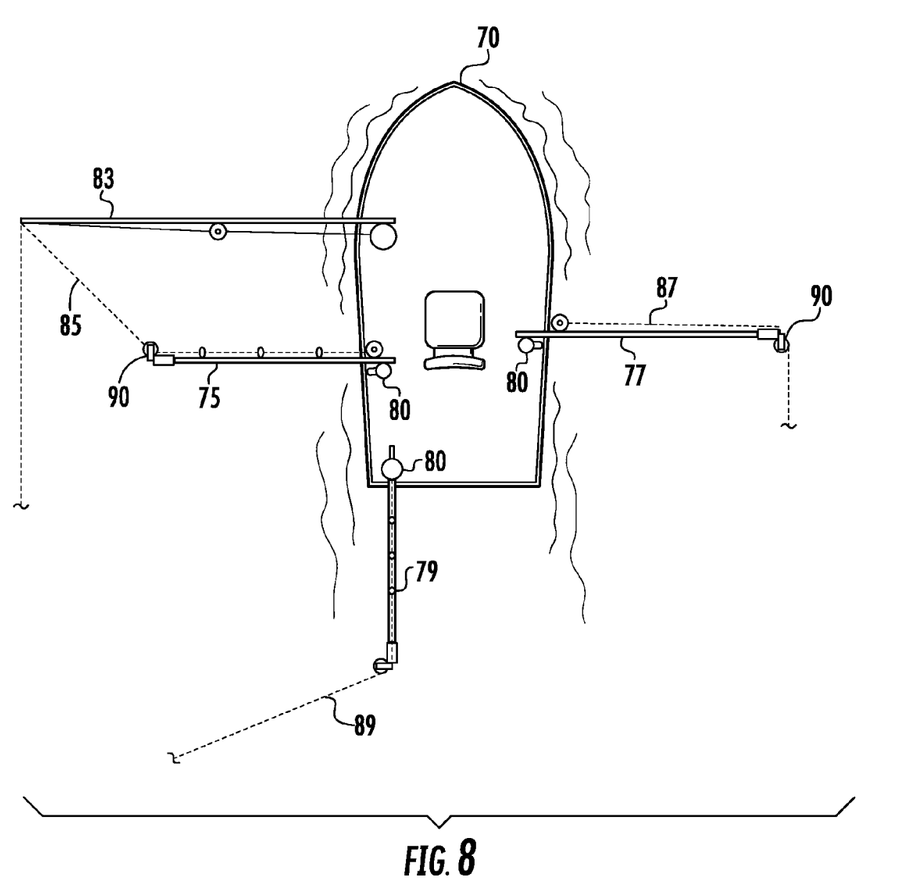
FIG. 8 is a top view of a swiveling tip for a fishing rod in use on a fishing boat.

As shown in FIG. 8, the swiveling tip for a fishing rod may be used in connection with outriggers on a fishing boat. Boat 70 is equipped with fishing rods 75, 77 and 79 using fishing lines 85, 87 and 89 respectively. One or more outriggers, such as outrigger 83 may be used. Each of fishing rods 75, 77 and 79 includes a reel 80 and a swiveling tip 90. The free motion of the swiveling tips allows the tips to be used with fishing rods alone or with outriggers without becoming disengaged with the tip.

Figure 9:
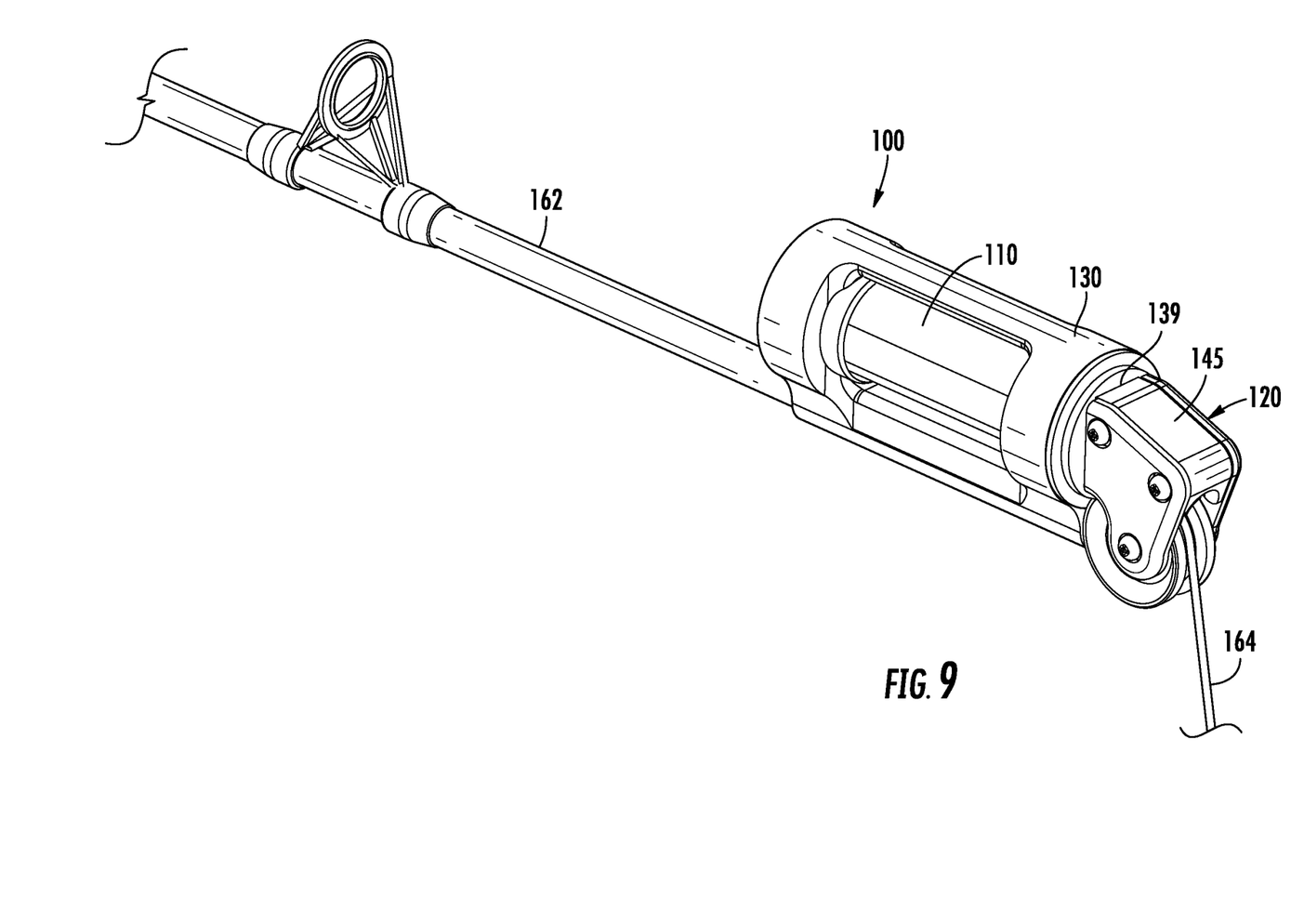
FIG. 9 illustrates an embodiment of a swiveling tip assembly in an assembled configuration.
Figure 10:
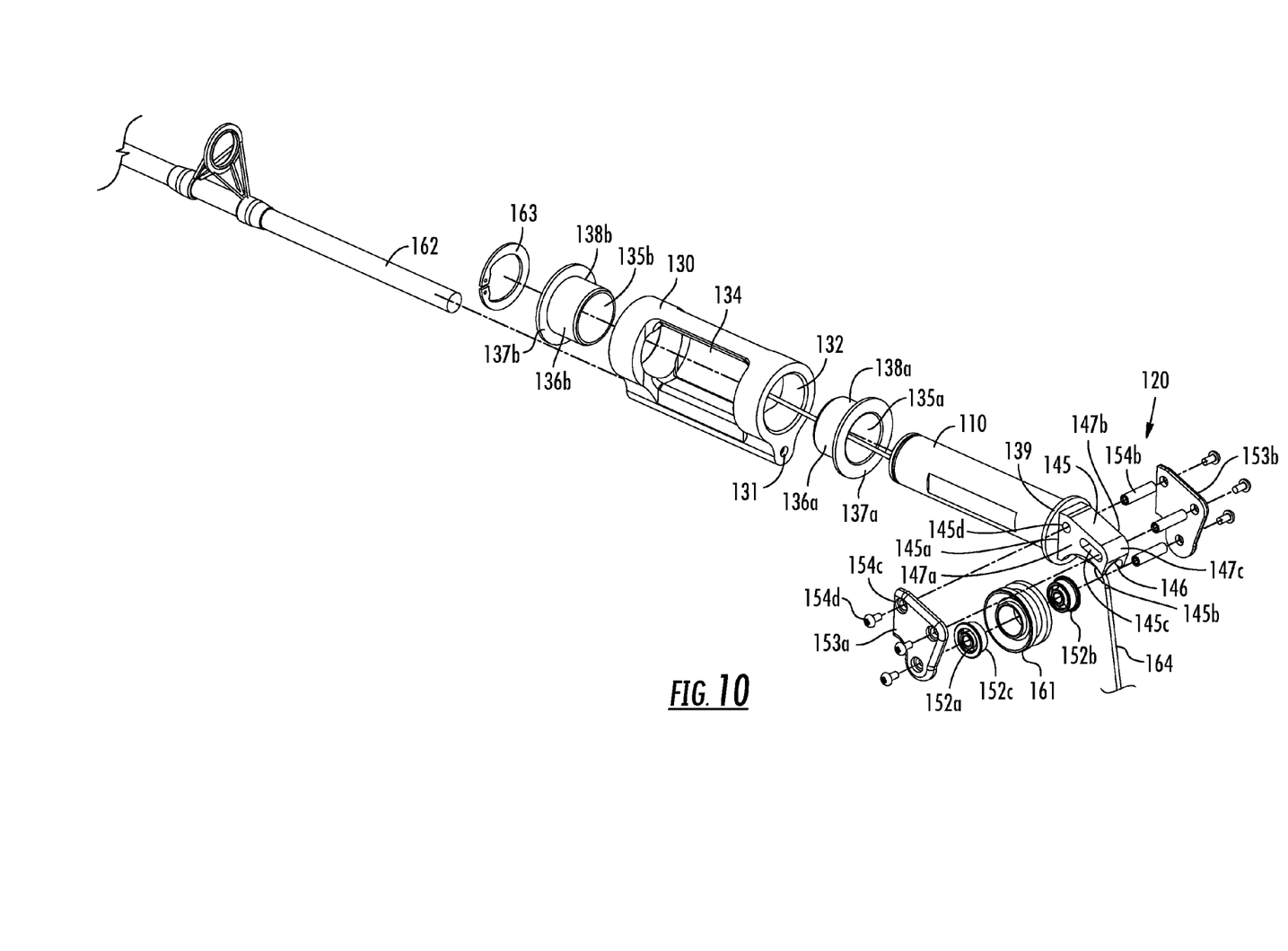
FIG. 10 is an exploded view of the swiveling tip assembly of FIG. 9.
Figure 11:
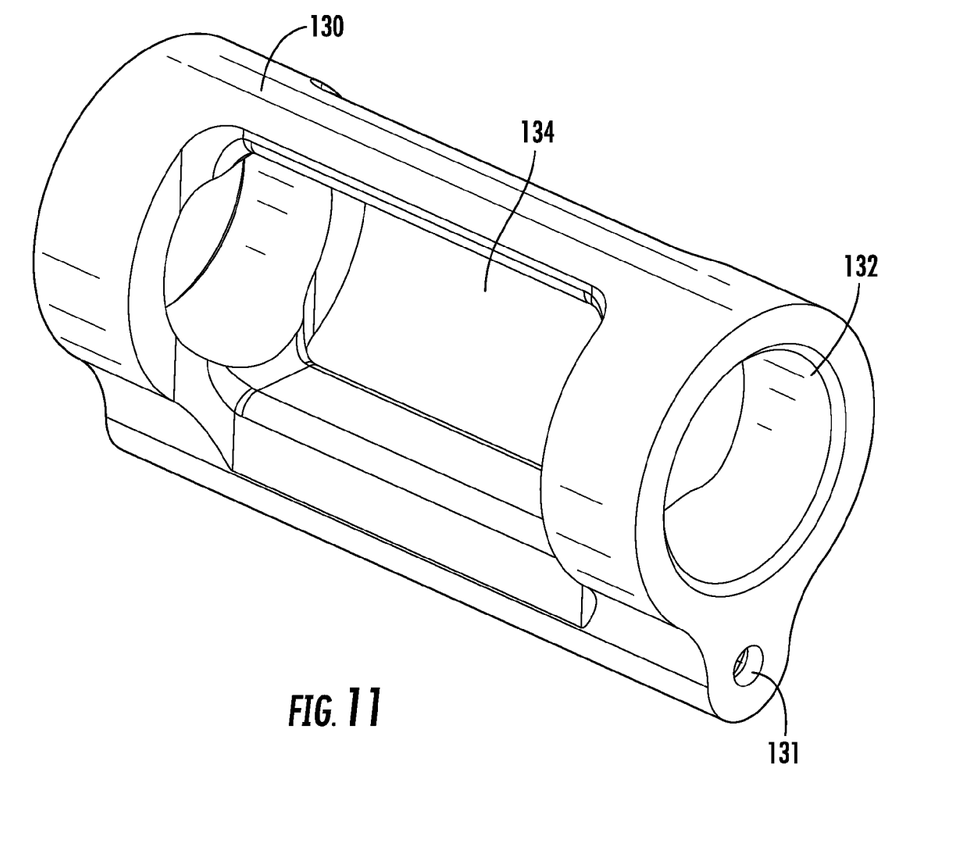
FIG. 11 is a perspective view of an embodiment of a housing for a swiveling tip assembly for a fishing rod.

FIGS. 9-12 1 illustrate an additional embodiment of a swiveling tip assembly 100 for a fishing rod 162. FIG. 9 illustrates swiveling tip assembly in an assembled configuration and FIG. 10 is an exploded view of the swiveling tip assembly 100. Swiveling tip assembly 100 includes a housing 130, barrel 110, and guiding assembly 120. Housing 130, which is shown in detail in FIG. 11, includes a first smaller bore 131 and a second larger bore 132, as well as cut-out portion 134. Cut-out portion 134 provides visual access to the inside of housing 130 once barrel 110 is inserted into bore 132. Fishing rod 162 is inserted into bore 131.

Figure 12:
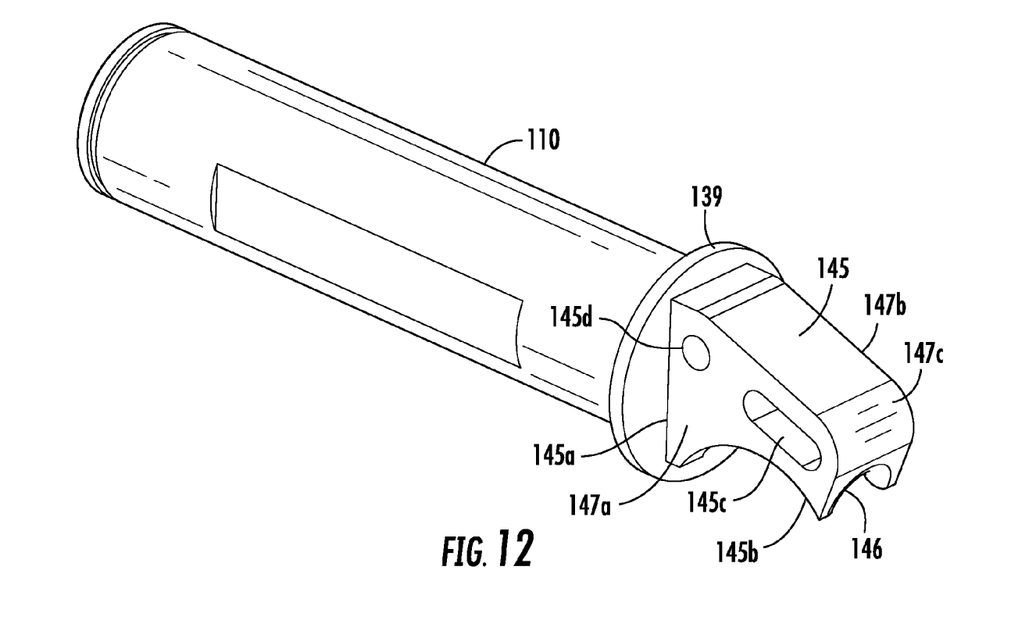
FIG. 12 is a perspective view of an embodiment of a barrel for a swiveling tip assembly for a fishing rod.

When swiveling tip assembly 100 is fully assembled, barrel 110 fits inside housing 130 by insertion of barrel 110 inside housing bore 132. Barrel 110, as shown in FIG. 12, is a rotatable shaft that rotates when fishing line 164 changes direction corresponding to a change of direction by a fish attached to line 164. In addition, the rotation of barrel 110 inherently results in the rotation of a nose 145 which is attached to barrel 110. Thus, when line 164 changes direction, it is subject to minimal friction since rotation of barrel 10 allows fishing line 64 to move radially as well as axially. This reduced friction of line 164 in turn extends the use life of line 164 and minimizes breakage thereof. That is, because a fish generally moves both radially and axially, swiveling tip assembly 100 better accommodates the natural movement of a fish.

The process of attaching barrel 110 into housing 130 will next be described with reference to FIG. 10. A first bushing 138a is inserted into one side of bore 132, and a second bushing 138b is inserted into the opposite side of bore 132. Bushing 138a includes a hole 135a and bushing 138b includes a hole 135b through which, line 164 passes. Both of bushings 138a and 138b include protruded portions 136a and 136b, as well as respective rims 137a and 137b. Fishing line 164 is inserted through hole 135b of bushing 138b and is drawn through housing 130. Once hole 135b receives fishing line 164 therethrough, protruded portion 136b of bushing 138b is inserted into housing 130 at bore 132. Retaining clip 163 is placed next to bushing 138b around rim 137b in order to ensure that line 164 is retained within housing 130. Next, line 164 is fed into protruded portion 136a, which is thereafter inserted into the opposite side of housing 130 via bore 132. In addition, bore 131 receives fishing rod 162 therein.

Next, barrel 110 is inserted into hole 135a of busing 138a to complete the insertion of barrel 110 into housing 130. Thus, the combination of protruded portions 136a and 136b with retaining clip 163 acts to maximize the fit of barrel 110 into housing 130. Fishing line 164 is fed through barrel 110 and exits barrel 110 at nose 145. Nose 145 forms part of a guiding assembly 120 which is discussed infra.

Guiding assembly 120 guides and receives fishing line 164 as the line exits barrel 110 and enters the exterior environment, such as a lake, stream, or other body of water. Guiding assembly 120 includes nose 145, which is disposed proximate to barrel 110 at a side opposite to housing 130. A back side 145a of nose 145 lies flush against a disc 139 and barrel 110. A roller 161 lies in close proximity to nose 145 at an underside 145b thereof and includes a roller groove 161a. Fishing line 164 exits barrel 110 and abuts an under portion of nose 145. Line 164 is held between nose 145 and roller groove 161a.

Nose 145 includes two symmetric opposing sides, 147a and 147b, as well as a front sloping portion 147c. Nose 145 has a fully profiled radius 146 adapted to correctly position fishing line 164 and to receive roller 161. The profiled radius 146 provides an ultra smooth surface, which maintains line 164 on roller 161 and facilitates rotating motion of fishing line 164 as its tension changes from taut to slack. This in turn increases the useful life of line 164 and minimizing breakage thereof.

Two identical and opposing sides 147a and 147b of nose 145 comprise respective slots, one of which is shown at 145c, and alignment holes, one of which is shown at 145d. Side plates 153a and 153b are disposed in abutting relationship to stainless steel flanged radial ball bearings 152a and 152b equipped with extended inner races 152c. The design of side plates 153a and 153b allow for precise machining of rotating barrel 110 as well as roller 161. Side plates 153a and 153b may be color coded red and green to comply with nautical standards. Color-coded side plates provide an added advantage of visually indicating the direction of line 164. Extended inner races or flanges 152c are disposed on bearings 152a and 152b in order to abut openings on either side of roller 161. In addition, bearings 152a and 152b also abut side plates 153a and 153b on a non-flanged side thereof.

Side plates 153a and 153b comprise three clearance holes 154c into which three mounting screws 154d are inserted. Mounting screws 154d subsequently contact a set of three alignment pins 154b disposed proximate to side plate 153b. Alignment pins 154b are subsequently inserted through slot 145c as well as alignment hole 145d, respectively disposed on nose 145. One alignment pin 154b is inserted through the center of roller 161 and flanged bearings 152a and 152b on either side of roller 161.

Thus, the combination of clearance holes 154c, mounting screws 154d, alignment pins 154b, slot 145c, and alignment hole 145d, aid in aligning and securing side plates 153a and 153b to nose 145 to thereby connect all parts of guiding assembly 120. Similarly, side plates 153a and 153b in addition to flanged bearings 152a and 152b, alignment holes 154c, alignment pins 154b, and mounting screws 154d, act to accurately and securely position roller 161 in close proximity to nose 145, with minimal clearance, so as to guide and receive fishing line 164 therebetween. The combination of minimal clearance between nose 145 and roller 161 as well as profiled radius 146, prevent breakage or damage to line 164 and facilitate movement thereof.

Figure 13:
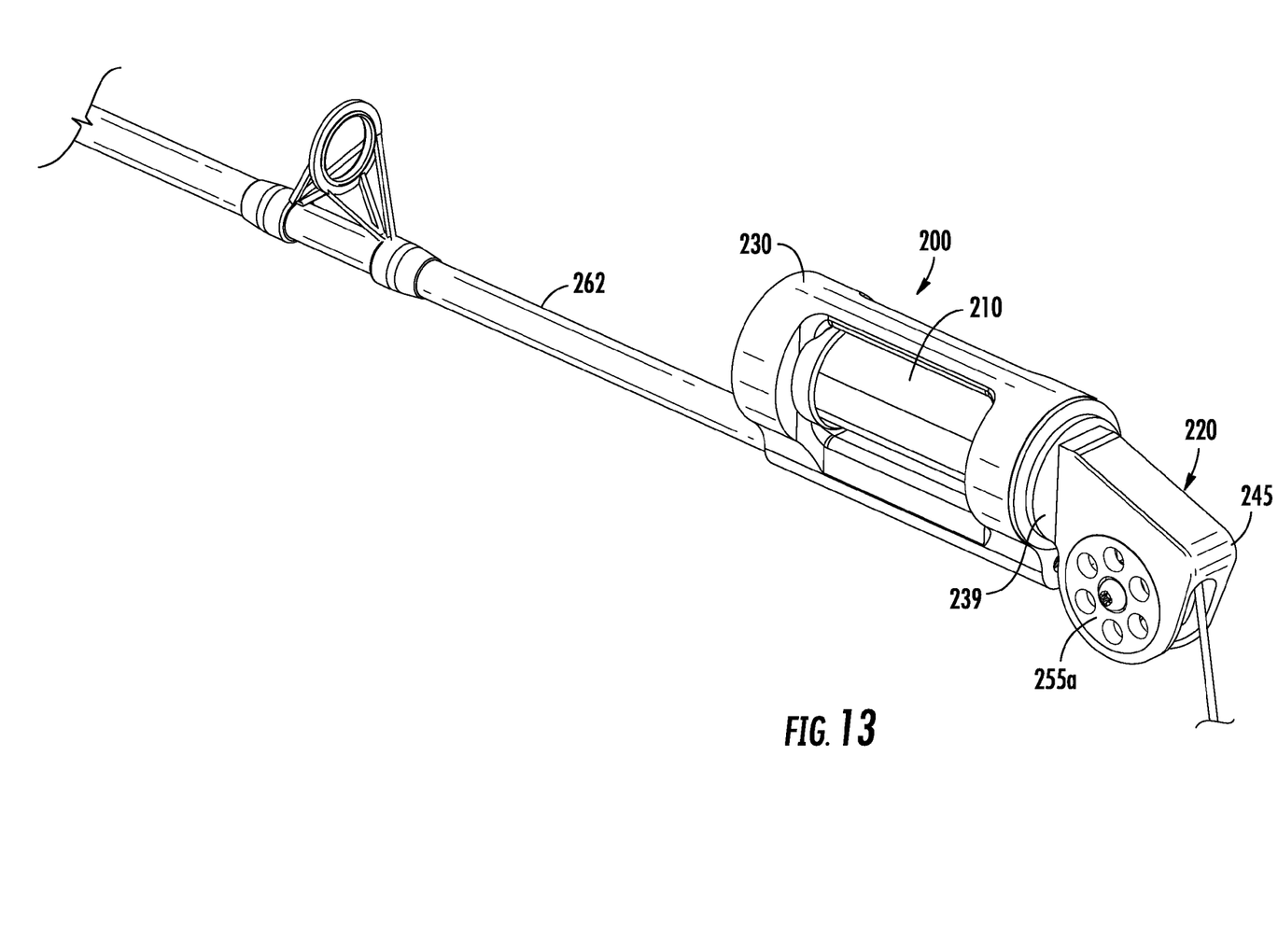
FIG. 13 is an additional embodiment of a swiveling tip assembly for a fishing rod in an assembled configuration.
Figure 14:
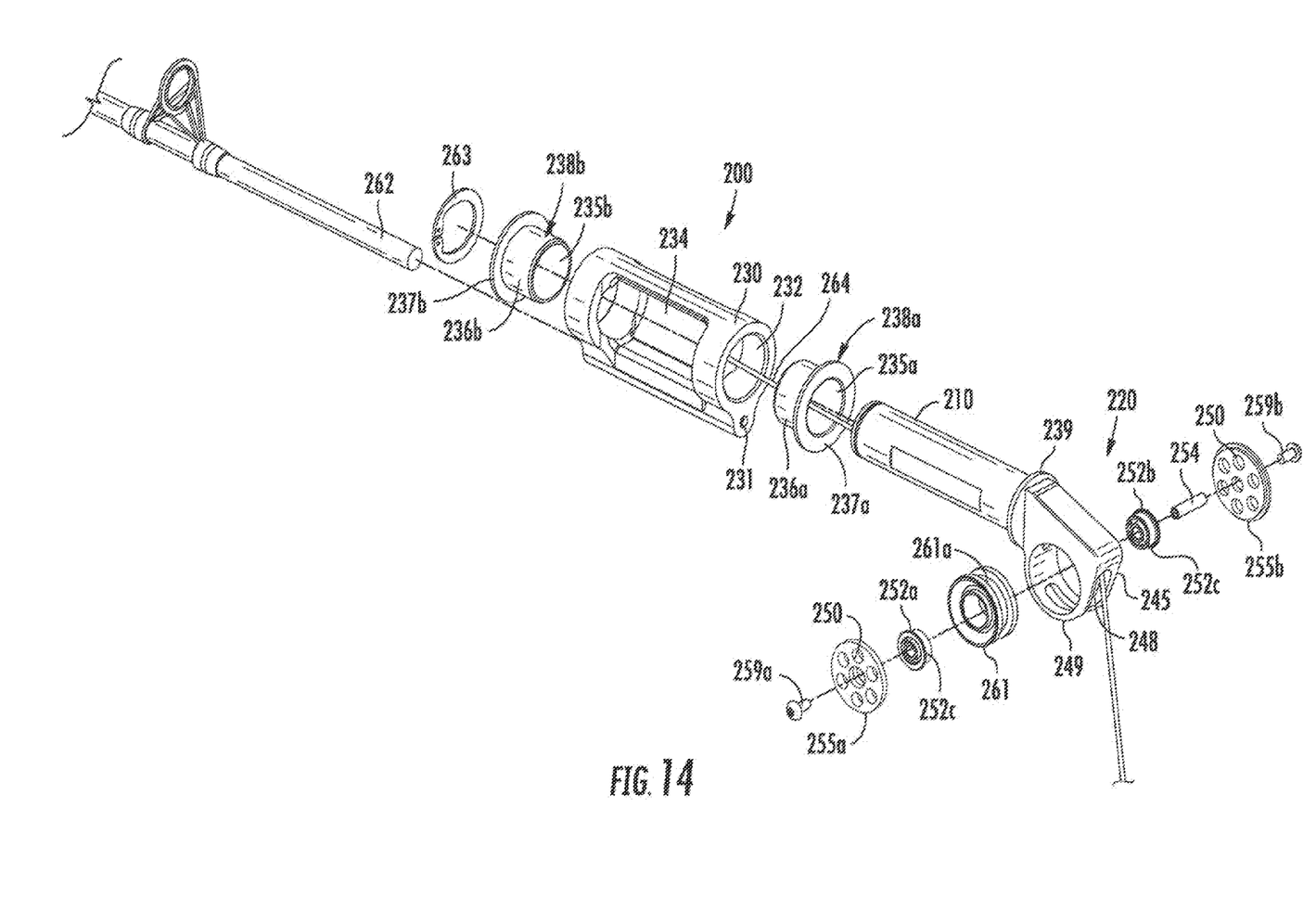
FIG. 14 exploded view of the swiveling tip assembly of FIG. 13.
Figure 15:
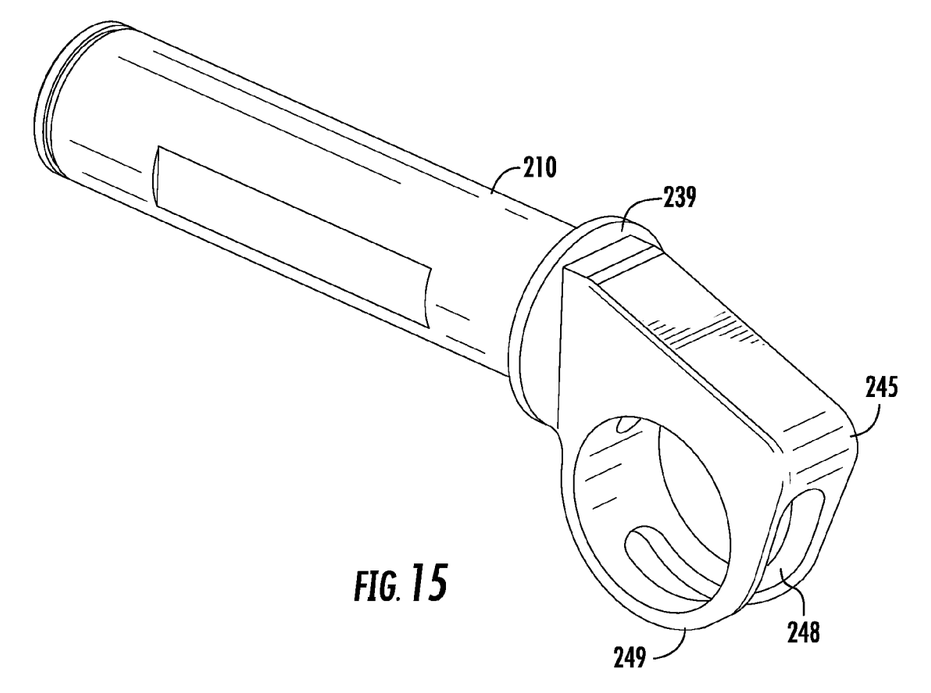
FIG. 15 is a perspective view of an embodiment of a barrel for a swiveling tip assembly for a fishing rod.

FIGS. 13-15 illustrate an additional embodiment of a swiveling tip assembly 200 for a fishing rod. Swiveling tip assembly 200 includes a housing 230, barrel 210, and guiding assembly 220. Housing 230 includes a first smaller bore 231 and a second larger bore 232, as well as cut-out portion 234. Cut-out portion 234 provides visual access to the inside of housing 230 once barrel 210 is inserted into bore 232. Fishing rod 262 is inserted into bore 231.

When swiveling tip assembly 200 is fully assembled, barrel 210 fits inside housing 230 via housing bore 232. Barrel 210 is a rotatable shaft that rotates when fishing line 264 changes direction. The process of attaching barrel 210 into housing 230 will next be described.

As in the previous embodiment, a first bushing 238a is inserted into one side of bore 232, and a second bushing 238b is inserted into the opposite side of bore 232. Bushing 238a includes as hole 235a and bushing 238b includes a hole 235b through which line 264 passes. Both of bushings 238a and 238b also include protruded portions 236a and 236b, as well as respective rims 237a and 237b.

Fishing line 264 is inserted through hole 235b of bushing 238b and is drawn through housing 230. Once hole 235b receives fishing line 264 therethrough, protruded portion 236b of bushing 238b is inserted into housing 230 at bore 232. Retaining clip 263 is placed next to bushing 238b around rim 237b in order to ensure that line 264 is retained within housing 230. Next, line 264 is fed into protruded portion 236a, which is thereafter inserted into the opposite side of housing 230 via bore 232. In addition, bore 231 receives fishing rod 262 therein.

Barrel 210 is inserted into hole 235a of busing 238a to complete the insertion of barrel 210 into housing 230. Thus, the combination of protruded portions 236a and 236b with retaining clip 263 acts to maximize the fit of barrel 210 into housing 230. Fishing line 264 exits barrel 210 at nose 245. Nose 245 forms part of a guiding assembly 220 which is discussed infra.

Guiding assembly 220 guides and receives fishing line 264 as the line exits barrel 210 and enters the exterior environment, such as a lake, stream, or other body of water. As with the previous embodiment, the main part of assembly 220 is nose 245, which is disposed proximate to barrel 210 at a side opposite to housing 230. The back side of nose 245 lies flush against barrel 210 via disc 239. As distinguished from the previous embodiment, roller 261 is encircled by nose 245. Fishing line 264 exits barrel 210 and is fed through slot 248 formed in round portion 249 of nose 245. Roller 261 is inserted into round portion 249 and line 264 is fed onto roller groove 261a.

A set of round side plates 255a and 255b comprising a plurality of clearance holes 250 dispersed uniformly throughout, are disposed in abutting relationship to a set of stainless steel flanged radial ball bearings 252a and 252b equipped with extended inner races 252c. Side plates 255a and 255b may be color coded red and green to comply with nautical standards. Color-coded side plates provide an added advantage of visually indicating the direction of line 264.

Extended inner races or flanges 252c are disposed on bearings 252a and 252b in order to abut openings on either side of roller 261. In addition, bearings 252a and 252b also abut side plates 255a and 255b. Mounting screws 259a and 259b are inserted into clearance holes 250 of circular side plates 255a and 255b. Mounting screw 259b located proximate to side plate 255b, subsequently contacts alignment pin 254, which contacts flanged bearing 252b. Mounting screw 259a contacts flanged bearing 252b on the opposing side of roller 261.

Once assembled, fishing line 264 is fed through hole 235b in bushing 238b, which has been inserted into bore 232 of housing 230. Fishing line 264 is threaded through housing 230 and hole 235a of bushing 238b. Exiting housing 230, fishing line 264 enters barrel 210 and exits through disc 239 and onto roller groove 261a. Fishing line 264 proceeds over roller groove 261a and is subsequently fed through slot 248 formed in round portion 249 of nose 245. As opposed to the previous embodiment, slot 248 is a continuous radial slot that wraps partially around roller 261. As with the previous embodiment, this design also eliminates sharp edges and minimize stress on line 264 to thereby increase its useful life. The fishing line subsequently exits the device and enters the exterior environment, such as a lake, stream, or other body of water.

While specific embodiments of the swiveling tip for a fishing rod have been described in detail, those with ordinary skill in the art will appreciate that various modifications and alternatives to those details could be developed in the light of the overall teachings of the disclosure. For example, various shapes of housings could be used, various means for attaching the roller tip to the fishing rod (e.g. glue), and varying geometries of the barrel could be used to achieve the results described herein. The examples used to illustrate the embodiments of the present invention in no way limit the applicability of the present invention to them.

We claim:

1. A swiveling tip for a fishing rod comprising:
    a housing, having a first bore and a second bore therethrough, the first bore and the second bore having first and second longitudinal axes respectively, wherein the first and second longitudinal axes are generally parallel, and wherein the first bore is adapted for receiving the tip of a fishing rod, said housing having a wall cut-out portion formed therein for providing visual access to an inside of the housing;
    a first bushing inserted into a first side of the second bore of the housing and a second bushing inserted into an opposite side of the second bore of the housing;
    a barrel disposed in the second bore of the housing, said barrel having a center axis and a through hole, said through hole being parallel to and offset from the center axis of the barrel for receiving a fishing line therethrough, wherein the barrel has a diameter that is smaller than the diameter of the second bore, and the barrel is able to rotate 360° around the second longitudinal axis of the second bore;
    a guiding assembly extending longitudinally from said barrel and comprising a nose member having two opposing sides, a top portion, a bottom portion, and a roller receiving portion with a cut-out portion formed therein; and
    a roller disposed within the roller receiving portion of the nose member, said roller being configured to rotate, said roller comprising a roller groove, wherein said roller groove and nose member are adapted to guide and receive a fishing line therebetween with the fishing line being guided through the cut-out portion of the nose member.

2. The swiveling tip for a fishing rod of claim 1, wherein said roller and nose member are disposed are disposed in close proximity therebetween.

3. The swiveling tip for a fishing rod of claim 1, wherein said guiding assembly comprises two side plates adapted to retain said roller in close proximity to said nose member.

4. The swiveling tip for a fishing rod of claim 1, wherein said roller comprises a roller groove and wherein said roller groove and slot are adapted to guide and receive a fishing line therebetween.

5. The swiveling tip for a fishing rod of claim 1, wherein said guiding assembly comprises a plurality of bearings adapted to optimally position said roller groove to receive said fishing line.

6. The swiveling tip for a fishing rod of claim 3, wherein said side plates are colored to match nautical standards.

7. The swiveling tip for a fishing rod of claim 3, wherein said side plates comprise one or more clearance holes adapted to receive one or more alignment pins for positioning and fastening said plates and roller to said nose member.

8. A swiveling tip for a fishing rod comprising:
- a housing, having a first bore and a second bore therethrough, the first bore and the second bore having first and second longitudinal axes respectively, wherein the first bore is adapted for receiving the tip of a fishing rod, said housing having a wall cut-out portion formed therein for providing visual access to an inside of the housing;
- a first bushing inserted into a first side of the second bore of the housing and a second bushing inserted into an opposite side of the second bore of the housing;
- a barrel disposed in the second bore of the housing, said barrel having a center axis and a through hole, said through hole being parallel to and offset from the center axis of the barrel for receiving a fishing line therethrough, said barrel being rotatable about the second longitudinal axis of the second bore; and
- a guiding assembly extending from said barrel and including a nose member having two opposing sides, a top portion, a bottom portion, and a cut-out portion formed therein, said nose member being adapted to guide the fishing line through the cut-out portion of the nose member.

9. The swiveling tip for a fishing rod of claim 8, wherein a length of the barrel is four times a diameter of the second bore through the housing.

10. The swiveling tip for a fishing rod of claim 8 wherein the barrel is able to rotate 360° around the second longitudinal axis of the second bore.

11. The swiveling tip for a fishing rod of claim 8 further comprising a roller coupled to the nose member, said roller being configured to rotate about an axis perpendicular to said first and second longitudinal axes, said roller including a roller groove, wherein said roller groove and nose member are adapted to guide and receive a fishing line therebetween with said fishing ling being guided through the cut-out portion of the nose member.

* * * * *